March 29, 1932.  L. R. OAKES  1,851,682
POULTRY WATERING TROUGH
Filed Sept. 28, 1928
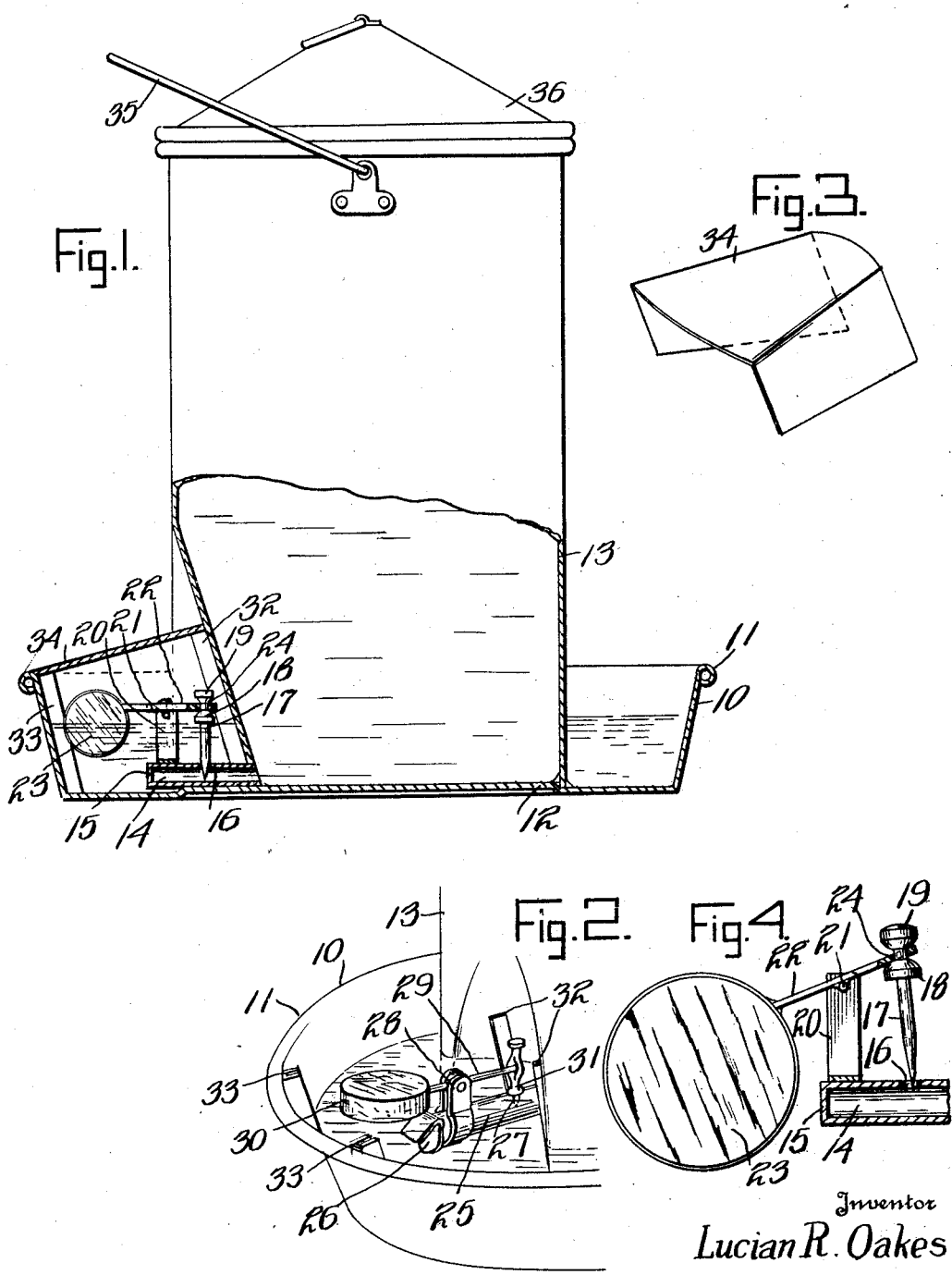
Inventor
Lucian R. Oakes Patented Mar. 29, 1932

1,851,682

UNITED STATES PATENT OFFICE

LUCIAN R. OAKES, OF TIPTON, INDIANA, ASSIGNOR TO THE OAKES MANUFACTURING COMPANY, OF TIPTON, INDIANA, A CORPORATION OF INDIANA

POULTRY WATERING TROUGH

Application filed September 28, 1928. Serial No. 308,952.

My said invention relates to improvements in poultry watering troughs and it is an object of the invention to provide a device of this character having a shallow trough with a reservoir or tank for reserve liquid with improved means for controlling the supply of the liquid from the reservoir to the trough.

Referring to the accompanying drawings, which are made a part hereof and on which similar reference characters indicate similar parts, Figure 1 is a side elevation partly in section illustrating one application of my invention, Figure 2, a detail fragmentary perspective, illustrating a modified form of my invention, Figure 3, a perspective of a cover for parts of the device, and Figure 4, an enlarged fragmentary detail.

In the drawings reference character 10 indicates a shallow pan or container preferably circular in shape and having its upper edge rolled over at 11 providing a re-enforcing rim. The pan 10 may be provided with a central upset portion 12 about which the lower extremity of a sleeve 13 arranged to form a fluid reservoir or tank adapted to contain a quantity of fluid to be dispensed to poultry, animals or the like is adapted to be soldered, or secured in any other desired manner, in upright position. The reservoir may be of any desired shape or construction, but preferably conforms in general outline to the circular pan 10 to which it is affixed. It is also bent inwardly adjacent its lower end to provide space for valve mechanism between the reservoir and the side of the pan adapted to control the supply of fluid from the reservoir into said pan.

In the preferred form of the invention, shown in Figure 1, a short nipple or pipe 14 is soldered or otherwise secured in an opening through the wall of the inwardly bent portion of the reservoir adjacent the bottom of the same and the end of the pipe 14 is closed at 15. A small opening or discharge outlet 16 is provided through the upper portion of the pipe and a needle valve 17 is mounted in a position to close the opening 16, said needle valve being provided with a pair of fixed spaced abutments 18 and 19. A substanially U-shaped bracket 20 is secured in an upright position in any desired manner on the pipe 14 adjacent its end and forms a support for a pivot pin 21 secured to the central portion of an arm 22, said arm carrying a float 23 at its outer end, and having an opening 24 at its inner end, in which is disposed the stem of the needle valve 17, said arm being disposed between the abutments 18 and 19 so that the movement of the arm relative to the valve 17 is limited and the arm is caused to remain substantially at right angles to the stem of the valve.

On account of the specific arrangement of the parts as just described, when the float lowers it elevates the needle valve to a position so that the major portion of the discharge outlet 16 is unobstructed but the point of the needle valve is in a position to be guided into seating position when it is lowered. Likewise on account of the stem of the valve and the opening 24 in the arm 22 being nearly the same size and the abutments 18 and 19 being in close proximity, the valve is maintained at all times substantially at right angles to the arm 22 which prevents the lowering of the arm and the float carried thereby a sufficient distance to cause disengagement of the valve from the opening which it closes.

In the modified form of the invention, as shown in Figure 2 a reservoir 13 is provided which is similar in construction to the reservoir of the preferred form previously described. Said reservoir is mounted in a shallow pan 10 having its upper edge rolled over at 11 providing a re-enforcing rim and having its body centrally upset as in the preferred form of my invention. The reservoir may also be bent inwardly adjacent its lower end, to provide sufficient space for valve mechanism between the reservoir and the side of the pan adapted to control the supply of the fluid from the reservoir into said pan. The inwardly bent portion is provided adjacent its lower edge with an opening in which is secured one end of a short nipple or pipe 25 the other end of which pipe is closed by means of a stop 26. The pipe 25 is provided with a small opening 27 through its upper side through which the fluid in the container may flow to fill the space or trough formed about the reservoir in the pan. I provide a bracket 28 on the pipe 25 and on said bracket I pivotally mount a lever 29 having a float 30 at its outer end and a needle valve 31 at its inner end, said needle valve being disposed in a position to close the opening 27 when the float is buoyed up by means of the water or other fluid in the trough. The stop 26 forms a rest for and limits the lowering movement of the float when the fluid in the trough is exhausted beyond a predetermined level. The needle valve is therefore constantly maintained in position so that it will properly seat and shut off the supply.

In order to protect the valve structures shown in Figures 1 and 2 and associated parts so that they will at all times function properly I have secured a pair of strips 32 to the reservoir 13, one on each side of the valve in upright position and a pair of grooved members 33 are secured in upright position to the side of the pan 10. A substantially U-shaped casing 34 comprising a body portion and a pair of legs is adapted to be held by said uprights in position over said valve with the front edges of the legs disposed in the grooves in the uprights secured on the side of the pan.

A handle 35 is preferably secured to the reservoir to facilitate carrying the same, and a removable top or cover 36 may also be provided.

My invention comprises few and simple parts, there being a pan, a sleeve or pipe secured therein and a valve for controlling the flow of liquid from the reservoir through said sleeve into said pan. The guard and top are desirable for insuring the operation of the valve and for keeping foreign matter out of the reservoir.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A device of the class described comprising a shallow pan, an upright sleeve mounted in said pan, a pipe extending through the lower extremity of said sleeve into the pan and having an opening adjacent its end and with its outer end closed, a bracket on said pipe, an arm pivoted to said bracket adjacent its central portion, a float on one end of the arm, a needle valve on the opposite end of the arm, and a stop on the closed end of the pipe for limiting the upward movement of the needle valve to prevent it from becoming disengaged from the opening which it closes, substantially as set forth.

2. A device of the class described comprising a shallow receptacle, a reservoir mounted in said receptacle a supply pipe projecting from said reservoir into the receptacle and having discharge opening therein, a bracket fastened to the supply pipe, an arm pivoted to the said bracket, a float fixed to the outer end of the arm, a valve carried by the inner end of the arm and having a portion disposed in the discharge opening of the pipe, a stop on the closed end of the pipe for limiting the movement of the float to hold the valve from entirely disengaging with the discharge opening whereby the valve will be constantly maintained in a position to be guided toward the closed position, substantially as set forth.

In witness whereof, I have hereunto set my hand at Tipton, Indiana, this twenty-sixth day of September, A. D. nineteen hundred and twenty-eight.

LUCIAN R. OAKES.